A. J. MICHELIN.
DEMOUNTABLE RIM FOR VEHICLE TIRES.
APPLICATION FILED MAY 2, 1911.

1,043,714.

Patented Nov. 5, 1912.

2 SHEETS—SHEET 1.

A. J. MICHELIN.
DEMOUNTABLE RIM FOR VEHICLE TIRES.
APPLICATION FILED MAY 2, 1911.
1,043,714.
Patented Nov. 5, 1912.
2 SHEETS—SHEET 2.
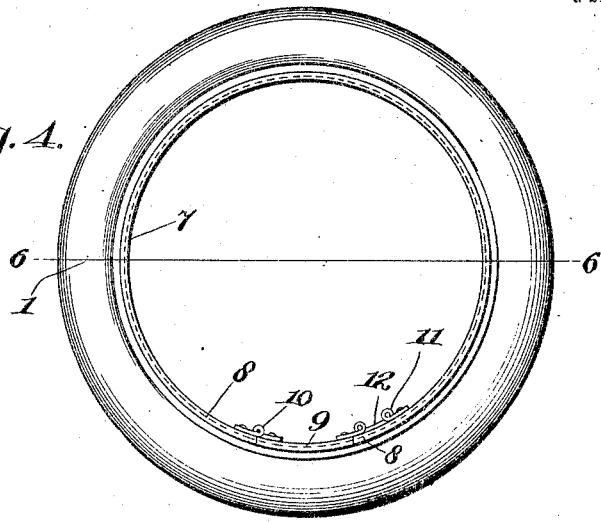
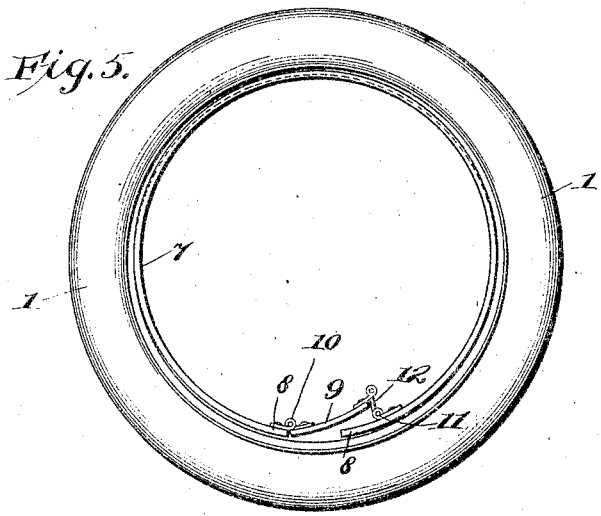
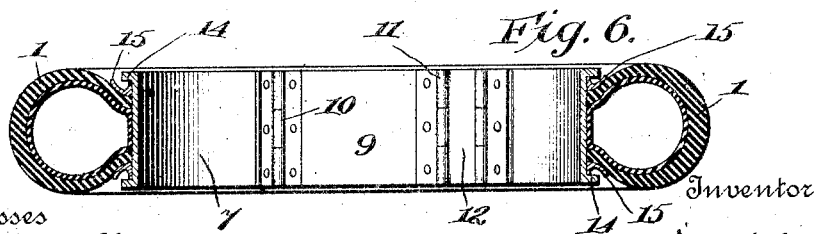

UNITED STATES PATENT OFFICE.

ANDRÉ JULES MICHELIN, OF PARIS, FRANCE, ASSIGNOR TO MICHELIN ET CIE., OF CLERMONT-FERRAND, FRANCE, A CORPORATION OF FRANCE.

DEMOUNTABLE RIM FOR VEHICLE-TIRES.

1,043,714.  Specification of Letters Patent.  Patented Nov. 5, 1912.

Application filed May 2, 1911. Serial No. 624,588.

*To all whom it may concern:*

Be it known that I, ANDRÉ JULES MICHELIN, a citizen of France, residing at Paris, in the Republic of France, have invented certain new and useful Improvements in Demountable Rims for Vehicle-Tires; and I do hereby declare the following to be a full, clear, and exact description of the invention, such as will enable others skilled in the art to which it appertains to make and use the same.

The present invention relates to demountable rims for vehicle tires and proposes an arrangement wherein the rims may be made of an undivided contractile body to the end that an easy and quick mounting or demounting of the tire may be effected; and wherein such changes may be made without the employment of mechanical appliances.

A known structure of demountable rim of the type in question comprises a divided ring which permits of contraction thereof but this division in the ring body is a source of considerable weakness, and there is the further disadvantage that tools are necessary to block the rim against the tire. The present invention avoids these disadvantages with having the greater portion of the rim unbroken, and its ends connected by a segmental section; said section connections permitting of the contraction of the rim; and the whole blocked against the tire simply by pressure against said section with hand or foot.

The invention is shown by illustration in the accompanying drawings, wherein:—

Figure 1:
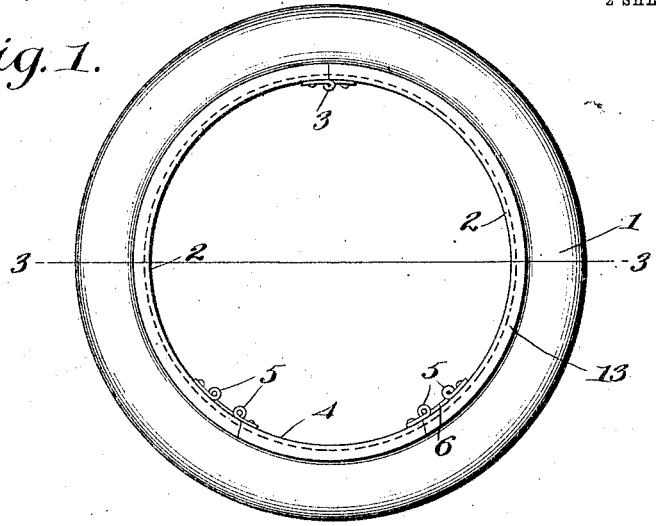
Figure 2:
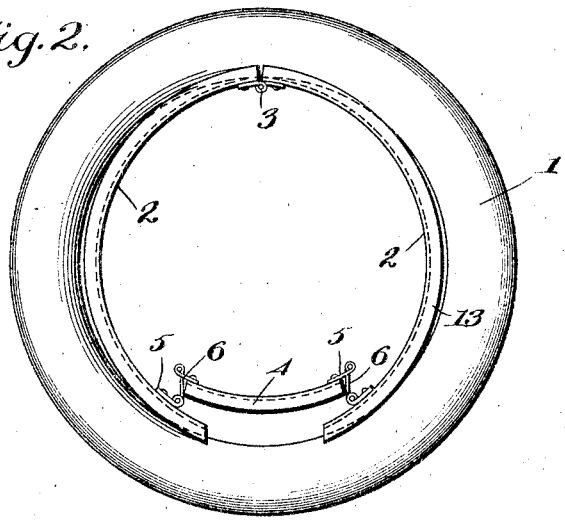
Figure 3:

Figure 1 illustrates the rim applied to a tire. Fig. 2 is a similar view but with the rim contracted for the mounting or demounting of the tire. Fig. 3 is a transverse sectional view of Fig. 1 taken on the line 3—3. Fig. 4 is a view corresponding to Fig. 1 of a modified arrangement. Fig. 5 is a view corresponding to Fig. 2 of the structure shown in Fig. 4, and; Fig. 6 is an enlarged sectional view of Fig. 4 taken on the line 6—6.

Referring to the several figures and with like reference characters indicating corresponding parts in the different views 1 designates a pneumatic tire which is mounted on the rim, said rim comprising a pair of main segmental sections 2 connected at one end by a hinge 3, and a relatively small segmental section 4 connecting the opposite ends thereof through the medium of a pair of suitable double hinges 5. The hinges 5 have each a link 6 adapted to permit of inward movement of the segment 4 whereby the rim may be contracted as will be readily understood.

The mounting of a tire on the rim is done in the following manner:—The rim section 4 is pushed inwardly of the rim circumference, to the position shown in Fig. 2 and the tire is then placed in position. The rim sections 2 are then pressed by hand against the tire and simultaneous with this movement the section 4 is forced in place by pressing with the foot, and such pressure being preferably directed against one of the double hinges. In demounting the above described operations are reversed; the tire having been deflated, the segment 4 is knocked against the ground, and this part with the sections 2 are pressed inwardly, thus decreasing the rim circumference when the tire may be readily removed.

In the arrangement shown in Figs. 4 to 6 the rim consists of a relatively large and unbroken section 7, the ends 8 of which are connected by a relatively short segmental section 9 through the medium of a single hinge 10, and a double hinge 11; said double hinge comprising a link 12 which permits of the necessary contraction of the rim, as shown in Fig. 5. In both cases the segment 4 of the rim is always held strongly in position through the pressure of the inflated tire, which pressure further tends to close the ends of the other sections. In each of the arrangements the ends of the segmental sections meet squarely so as to give a smooth and uninterrupted tread for the tire. And the rim edges are designed to have the form necessary to their respective supported tires; thus in Fig. 1 said rim is formed with clencher flanges 13 for clencher tires; and in the second embodiment the flanges 14 provide a channel for the side flanges 15, which are shown in connection with a wire beaded tire cover.

In any of the arrangements shown in Figs. 1 to 5 a stiff and complete circular rim is provided, all the parts of which are firmly and permanently secured together, and in which by the simple act of throwing in a short portion of the rim, it may be readily removed as a whole from the tire.

I am aware that rims have been built up of a series of small links hinged or pivoted together, but these are largely lacking in rigidity and are difficult to apply and inefficient when in use.

What is claimed as new is:—

The combination with a tire, of a demountable rim therefor comprising a pair of main segmental sections, a hinge connecting said sections, a relatively short segmental section; and hinges connecting said short section with said main sections; said last named hinges including a link member adapted to permit of slight inward movement of the short section, as set forth.

In testimony whereof, I affix my signature, in presence of two witnesses.

ANDRÉ JULES MICHELIN.

Witnesses:
H. C. COXE,
JACK H. BOKE.